United States Patent
Coel et al.

(10) Patent No.: US 6,673,283 B2
(45) Date of Patent: Jan. 6, 2004

(54) METHOD FOR OPTICAL CONTROL OF AN ADJUSTABLE CORE PIN FOR VIAL MOLDING

(75) Inventors: Joseph B. Coel, Waterford, WI (US); Roger D. Stanford, Oconomowoc, WI (US)

(73) Assignee: Empire Level Mfg. Corp., Milwaukee, WI (US)

( * ) Notice: Subject to any disclaimer, the term of this patent is extended or adjusted under 35 U.S.C. 154(b) by 111 days.

(21) Appl. No.: 10/060,503

(22) Filed: Jan. 30, 2002

(65) Prior Publication Data

US 2003/0141616 A1 Jul. 31, 2003

(51) Int. Cl.[7] .................................. B29C 45/80
(52) U.S. Cl. .................. 264/40.5; 264/328.1; 425/140; 425/150; 425/169; 425/173; 425/577
(58) Field of Search ................. 264/408, 40.5, 264/40.1, 328.1; 425/135, 140, 172, 173, 169, 171, 555, 577, 141, 150; 356/625; 249/155, 157, 104

(56) References Cited

U.S. PATENT DOCUMENTS

| | | | |
|---|---|---|---|
| 3,677,680 A | * | 7/1972 | Etherington ............. 425/129.1 |
| 3,737,277 A | | 6/1973 | Uhlig |
| 3,856,256 A | | 12/1974 | Celesti |
| 4,086,044 A | * | 4/1978 | Sikora ........................ 425/113 |
| 4,303,221 A | | 12/1981 | Gallusser et al. |
| 4,919,608 A | | 4/1990 | Catalanotti et al. |
| 5,364,252 A | * | 11/1994 | Hlavaty et al. ................. 425/3 |
| 5,387,389 A | | 2/1995 | Catalanotti et al. |
| 5,630,977 A | | 5/1997 | Catalanotti et al. |
| 5,686,032 A | * | 11/1997 | Mizobe et al. ............. 264/40.3 |
| 5,736,172 A | | 4/1998 | Urmston |
| 5,750,161 A | | 5/1998 | Schock, Jr. et al. |
| 5,760,413 A | * | 6/1998 | Kurachi et al. ......... 250/559.28 |
| 5,820,807 A | | 10/1998 | Urmston |
| 5,989,466 A | * | 11/1999 | Kato et al. ................. 264/40.5 |
| 6,549,292 B1 | * | 4/2003 | Schmidt et al. ............. 356/630 |
| 6,567,162 B2 | * | 5/2003 | Koren et al. ............. 356/237.2 |

* cited by examiner

Primary Examiner—Jill L. Heitbrink
Assistant Examiner—Monica A Fontaine
(74) Attorney, Agent, or Firm—Jansson, Shupe & Munger, Ltd.

(57) ABSTRACT

An adjustable core pin, and method of use thereof, for molding vials for use in levels, including an elongate rod with a barrel-shaped distal section having a crest at its cross section with the greatest diameter and a rod retainer with a cavity which receives the rod such that the distal end of the rod projects from a rod retainer distal opening, the rod being adjustable in relation to the rod retainer so that the crest can be adjustably placed at a preferred position in a molding cavity for vial molding.

10 Claims, 5 Drawing Sheets

METHOD FOR OPTICAL CONTROL OF AN ADJUSTABLE CORE PIN FOR VIAL MOLDING

FIELD OF THE INVENTION

This invention relates generally to molding processes using core pins, and in particular, to a process of molding barrel-shaped vials for use with levels.

BACKGROUND OF THE INVENTION

The molding process for making barrel-shaped vials or other tube-like items with elongate cavities typically utilizes injection molding around a core pin. Injection molding of plastic materials is well known in the art and is well suited for forming a large number of discrete items such as vials.

During the injection molding process, a core pin is inserted into a molding cavity such that the space between the pin and cavity defines the shape of the intended product mold. When the pin is positioned in the cavity, a plastic material, such as acrylic, polycarbonate, polystyrene, butyrates or the like, is injected into the space between the pin and the cavity.

After the material has been allowed to cool, the pin is withdrawn from the cavity and an ejection ring or stripper located on the proximal end of the pin ejects or forces the molded plastic off of the core pin. The process is then repeated to form another vial.

Barrel-shaped leveling vials typically have circular cross-sections at any plane normal to the body axis (though there are vials with spherical radii having other cross-sections such as squares, rectangles, etc.). In order to function properly, the largest cross section must be formed at a known point between the proximal and distal ends of the vial. This requires that the core pin on which the vial is formed also has its largest cross section at a known point between the distal end and the ejection ring or stripper where the plastic mold ends.

Computer numerically controlled (CNC) grinder tools are typically utilized to fabricate core pins for use in level vial molding. While such grinders typically allow for great precision, in practice it is extremely difficult to fabricate core pins having the proper positioning and alignment of the largest cross section. Compounding that difficulty is the fact that the measurement of the position of the largest circular cross section on the core pin is extremely difficult to obtain. For instance, a core pin having a spherical radius of 9 inches, as an example, will have a radial decrease of only 0.000005556 inches from the largest cross section to a cross section located 0.01 inch away in either direction. Therefore, verification of the position of the largest cross section on the core pin is practically impossible.

Because the position of the core pin's largest cross section is so difficult to determine, core pins used for molding barrel-shaped level vials are inherently imprecise. Only upon the molding of numerous vials from one core pin and the optical inspection of these vials can the position of the largest cross section on that core pin be calculated. If the position is determined to be too close to the distal end, the core pin is defective and cannot be used. If the position is determined to be too far from the distal end of the core pin, the core pin can be ground further to center the position; however, this process is expensive and does not always result in a more precise core pin.

Therefore, an improved core pin and method of use thereof which addresses these problems of known core pins would be an important advance in the art.

OBJECTS OF THE INVENTION

It is an object of the invention to provide an improved core pin which can be adjusted after fabrication to allow the centering of its largest cross section.

Another object of the invention is to provide an adjustable core pin which can be secured to have a permanent determined length.

Another object of the invention is to provide an adjustable core pin which can be secured so that its largest cross section is permanently established at the desired position.

Another object of the invention is to provide an improved core pin which alleviates the need for adjustment of the molding plates or bases.

Another object of the invention is to provide an adjustable core pin with sufficient strength to withstand the stresses involved in injection molding.

Another object of the invention is to provide a method of use of the improved adjustable core pin which allows users to efficiently locate the largest cross section and center it in the cavity of the formed vial.

Still another object of the invention is to provide a method of use of the improved adjustable core pin which allows for readjustment of its crest at the desired position.

Yet another object of the invention is to provide a method of producing precise vials for use with levels and other leveling devices.

How these and other objects are accomplished will become apparent from the following descriptions and the drawings.

SUMMARY OF THE INVENTION

This invention is an improved core pin for molding vials for use in levels and method of use thereof The invention represents a significant advance over the state of the art by providing novel elements, including an multi-piece core pin which is adjustable to accurately position the vial's maximum inner diameter.

The adjustable core pin includes an elongate rod which has a proximal end, proximal and intermediate portions with preferably circular cross sections, and a distal end including a barrel-shaped section having a crest at the cross section with the greatest diameter. The intermediate portion has a smaller outer diameter than the proximal portion so that the rod has a shoulder at the junction of the proximal and intermediate portions.

The adjustable core pin also includes a rod retainer which has an elongate rod retainer cavity extended from a distal opening to a proximal opening. The elongate rod-retainer cavity receives the rod such that the distal end projects from the distal opening for a determinable length. The determinable length is adjustable so that the crest is placed at a preferred position for vial molding.

The preferred elongate rod-retainer cavity has first and second segments. The first segment has a first inner diameter substantially equal to the outer diameter of the proximal portion of the rod. The second segment has a second inner diameter substantially equal to the outer diameter of the intermediate portion of the rod. Therefore, the rod-retainer cavity has an inner shoulder at the junction of the first and second segments. In a preferred embodiment of the invention, the determinable length that the rod extends out of the rod retainer can be adjusted by the insertion or removal of shims between the shoulder and the inner shoulder so that the crest is properly positioned for vial molding.

The adjustable core pin preferably includes a stripper bushing which has a stripper-bushing cavity extending from a first end to a second end. A stripper surface is positioned at the second end so that when the stripper-bushing cavity receives the rod retainer and the stripper bushing and rod retainer are engaged, the stripper surface is adjacent to the distal end of the elongate rod. The stripper bushing is movable from this engaged position toward the distal portion of the rod so that the stripper surface is able to contact any vial molded on the distal portion and eject the vial from the rod at the conclusion of the molding cycle.

The preferred rod retainer comprises two integral sections, including a proximal section having a outer cylindrical shape and a distal section having an outer conical shape. In an alternate embodiment, the distal section may have a cylindrical shape. The rod retainer's distal section has a smaller outer diameter than the proximal section at the junction between the distal and proximal sections thereby forming a stripper shoulder. The preferred stripper-bushing cavity has a conical shape which corresponds to the outer conical shape of the distal section of the rod retainer (though it is foreseen that the stripper-bushing cavity may have a cylindrical shape to correspond with a rod retainer having a cylindrical distal section). The corresponding shape of the stripper-bushing cavity allows the stripper bushing to rest on the surface of the distal section of the rod retainer. The first end of the stripper bushing may rest on the stripper shoulder of the rod retainer when the stripper-bushing cavity receives the rod retainer.

The preferred elongate rod includes an annular recess located at its proximal end so that the diameter of the rod at its proximal end is less than the diameter of the rod at its proximal portion. The preferred rod retainer includes a recess located at its proximal opening so that the diameter of the rod-retainer cavity adjacent to the opening is greater than the first diameter of the rod-retainer cavity. This configuration allows a proximal-end seal retainer having a bore with an inner diameter substantially equal to the diameter of the rod at the proximal end and an outer diameter substantially equal to the diameter of the rod-retainer cavity adjacent to the opening to be positioned in the recesses of the rod and rod retainer. The proximal-end seal retainer includes seals which prevent fluid from passing through the interface between the rod and rod retainer. The proximal opening of the rod retainer preferably extends axially beyond the proximal end of the rod, but not axially beyond the proximal end of the rod retainer.

In a highly preferred embodiment, the proximal portion of the elongate rod and the first segment of the rod-retainer cavity of the rod retainer are threaded. This configuration allows adjustment of the determinable length by rotation of the proximal portion or the first segment with respect to the other of the proximal portion or the first segment so that the crest is properly positioned for vial molding. In this preferred embodiment, a spring washer can be inserted between the shoulder and inner shoulder to provide tension on the threads to prevent any unintended rotation between the rod and rod retainer.

In a broad form, this invention is a molding assembly for molding vials for use in levels comprising a molding cavity, an elongate rod and a rod retainer. The molding cavity receives the distal end during molding. The elongate rod preferably has a distal end including a barrel-shaped section having a crest at the cross section with the greatest diameter. The rod retainer preferably has an elongate rod-retainer cavity extending from a distal opening to a proximal opening. The rod-retainer cavity receives the rod such that the distal end projects from the distal opening for an adjustable determinable length so that, via adjustment, the crest can be placed at a preferred position within the molding cavity during vial molding.

The invention also includes a preferred method for forming vials having distal and proximal ends, a center between the ends and a barrel-shaped cavity with a maximum inner diameter positioned at the center, equidistant from each end. The steps involved include: providing a mold assembly including a molding cavity; providing an adjustable core pin including an elongate rod having a barrel-shaped distal portion with a crest and a rod retainer; inserting the rod into the molding cavity to define a molding space as the volume between the rod and the cavity; filling the molding space with moldable material to mold the vial; withdrawing the rod from the molding cavity; removing the vial from the rod; optically measuring the location of the maximum diameter; and, in response to the optical measurement, adjusting the rod in the rod retainer to establish the crest at the preferred position. Utilizing this method results in the formation of subsequent vials with a more accurate positioning of the maximum diameter.

In this method it is preferred that the rod and rod retainer are movable relative to each other and fastenable to each other such that the crest can be established at a preferred position. It is also preferred that the vial is removed from the rod by a stripper bushing in which the rod retainer is positioned.

It is also preferred that the location of the maximum diameter is optically measured by filling the vial with liquid and sealing the vial with a cap so that a bubble of gas remains inside the vial. Such optical measurement is preferably facilitated by use of vials with at least one marker ring against which the optical measurement of the location of the maximum diameter is performed. Optical measurement may be facilitated by use of a vial with two marker rings from which the maximum diameter is sought to be equidistant. Another preferred method includes measuring the maximum diameter so that it is equidistant from the external surface of the distal end of the vial and the external surface of the proximal end of the vial.

A preferred method includes forming and optically measuring a number of vials before the rod and rod retainer are adjusted to establish the crest and, thus, the maximum diameter at the preferred position.

Another preferred method includes optically measuring the location of the maximum diameter after formation of vials following adjustment of the rod and rod retainer, and in response to the optical measurement, readjusting the rod and rod retainer to reestablish the crest at the preferred position in order to obtain more accurate positioning of the maximum diameter at the center of the vial for the molding of subsequent vials.

It is further preferred that the mold assembly includes a molding base which the core pin is secured to before its insertion into the molding cavity.

The moldable material is preferably a plastic, and most preferably acrylic.

DETAILED DESCRIPTION OF PREFERRED EMBODIMENTS

Figure 1:
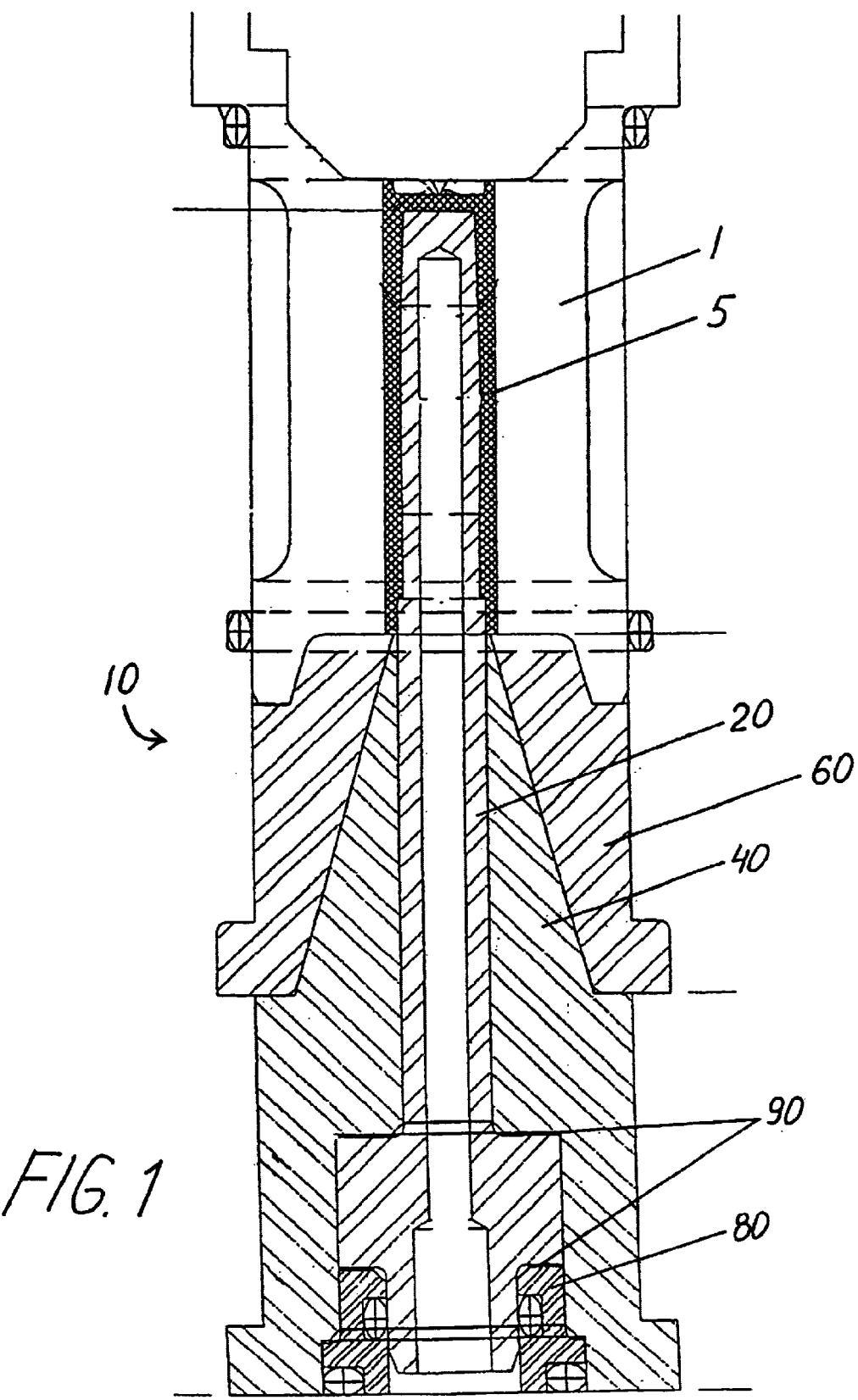
FIG. 1 is a cross-section view of the adjustable core pin, having the rod, rod retainer and stripper bushing engaged for insertion into a cavity mold, in accordance with the present invention.

Referring to the figures, details of the adjustable core pin for vial molding will be set forth. FIG. 1 depicts a cross-section of the adjustable core pin 10 upon insertion into a molding cavity 1. The adjustable core pin is comprised of rod 20, rod retainer 40, stripper bushing 60 and seal retainer 80. As is known in the art of injection molding, molding material 5 is forced into the space between rod 20 and molding cavity 1 and cooled to form the molded object.

Shims 90 are positioned between rod 20, rod retainer 40 and seal retainer 80 to adjust the length which the distal end of rod 20 projects into molding cavity 1. It is preferred that a fixed number of shims 90 be provided with each core pin. For instance, five shims may be provided at the distal shim position between shoulder 31 and inner shoulder 56 (see FIGS. 2 and 3). Another five shims may be provided at the proximal shim position against rod 20 along the perpendicular surface of recessed section 33 (see FIG. 2). If it is determined that the distal end of rod 20 extends too deeply into the molding cavity, i.e., the crest is too near the distal end of the vial, then rod 20 is removed from rod retainer 40 and a desired number of shims are moved from the proximal shim position to the distal shim position. Then rod 20 is reinserted into rod retainer 40. In this manner the placement of rod 20 is adjusted in relation to rod retainer 40 without adjustment of any other component.

Note that shims 90 could be solid machinable or resizeable spacers to adjust crest position. Alternatively, crest position could be adjusted by machining the rod retainer at the distal shim position or the rod at the proximal or distal shim positions. For instance, if the distal end of rod 20 extends too deeply into the molding cavity, then a desired thickness may be removed from rod 20 at the proximal shim position, and a spacer or shim of the same thickness added at distal shim position so that the rod is moved relative to rod retainer 40 and seal retainer 80.

Figure 2:
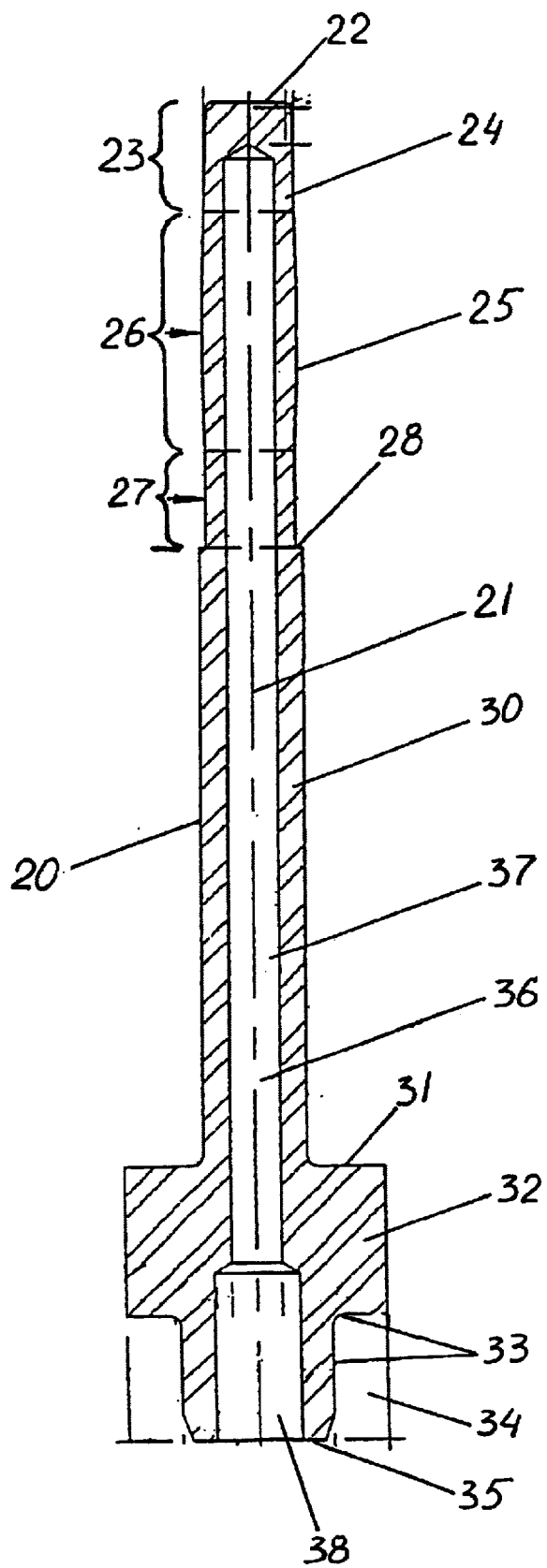
FIG. 2 is a cross-section view of the rod used in the adjustable core pin, in accordance with the present invention.

As is depicted in FIG. 2, rod 20 is elongate, extending from distal end 22 to proximal end 35, has a distal portion 24, intermediate portion 30, and proximal portion 32 and has a circular cross-section. The distal, intermediate and proximal portions are integral. Distal portion 24 includes a barrel-shaped section 26 defining a crest 25 at the cross-section with the greatest diameter in distal portion 24. Distal portion 24 includes first end-section 27 and second end-section 23 surrounding barrel-shaped section 26. The diameter of second end-section 23 is shown as tapering off slightly from barrel-shaped section 26 to distal end 22. The diameter of second end-section 23 need not taper off, but must be equal to or less than the diameter of first end-section 27 in order to avoid damaging the internal surface of the vial upon ejection. The diameter of first end-section 27 is constant from barrel-shaped section 26 to rod shoulder 28. Rod shoulder 28 is located at the junction of distal portion 24 and intermediate portion 30.

Intermediate portion 30 has a larger diameter than any section of distal portion 24. The diameter of intermediate portion 30 is substantially constant from rod shoulder 28 to the junction of intermediate portion 30 and proximal portion 32. Shoulder 31 is located at the junction of intermediate portion 30 and proximal portion 32 and has a surface substantially perpendicular to axis 21.

Proximal portion 32 extends from shoulder 31 to proximal end 35. Proximal portion 32 includes recessed section 33 along its outer surface adjacent to proximal end 35. Recessed section 33 has a smaller diameter than the rest of proximal portion 32. At the junction of recessed section 33 and the rest of proximal portion 32, the outer surface is substantially perpendicular to the axis. The diameter of recessed section 33 is substantially constant as it moves from the perpendicular surface toward proximal end 35, until it tapers to proximal end 35. Recessed section 33 defines recess 34.

Rod 20 includes bore 36 which extends from proximal end 35 to second end section 23. Bore 36 has a first region 38 which extends from proximal end 35 midway through proximal portion 32. Bore has a second region 37 which extends from first region 38 to second end section 23. The diameter of first region 38 is larger than the diameter of second region 37

Figure 3:
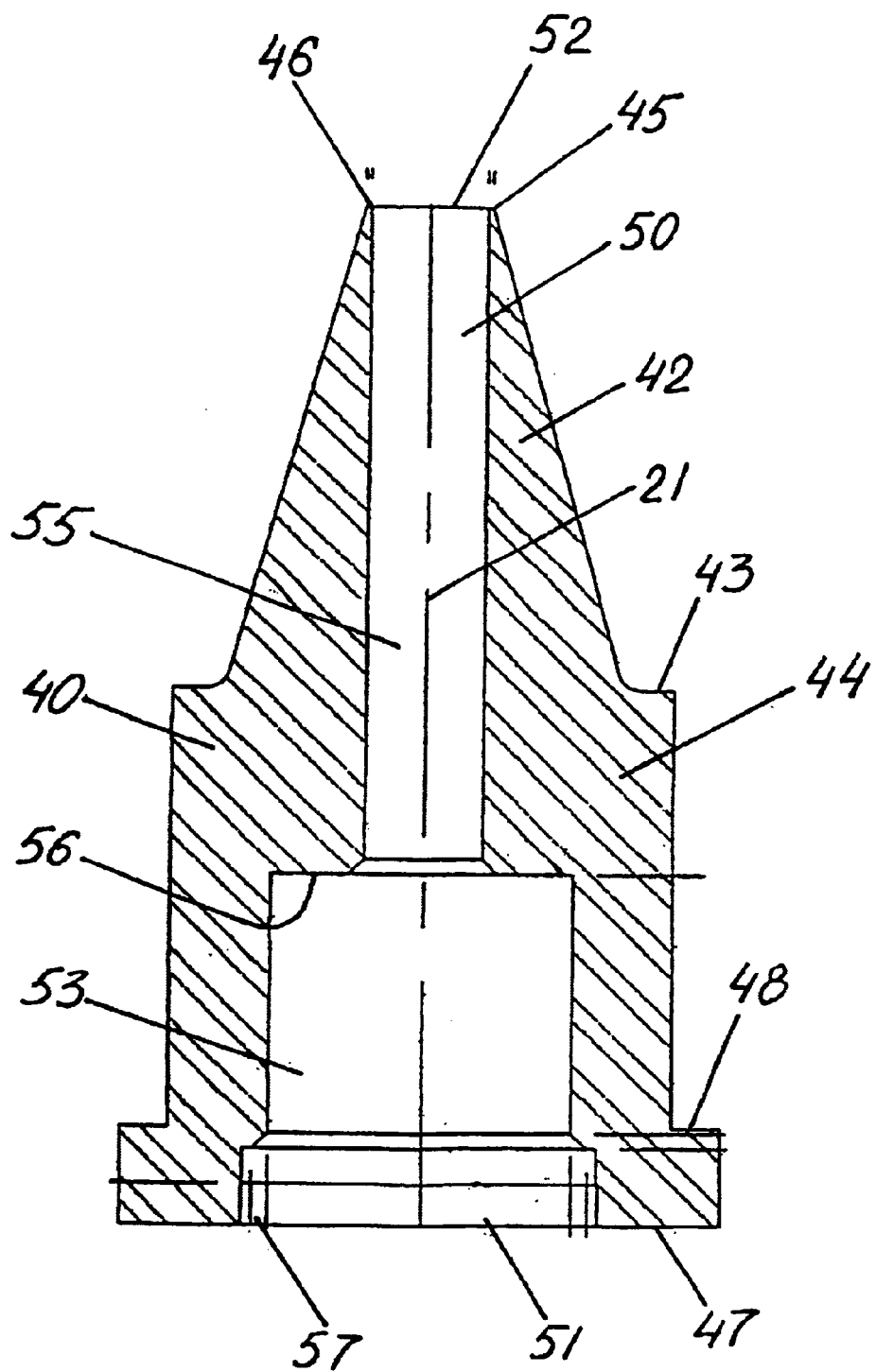
FIG. 3 is a cross-section view of the rod retainer used in the adjustable core pin, in accordance with the present invention.

FIG. 3 depicts rod retainer 40. Rod retainer 40 comprises conical section 42 and cylindrical section 44. Conical section 42 and cylindrical section 44 are integral. Stripper shoulder 43 is located at their junction and has a surface perpendicular to inner cavity axis 21. Conical section 42 extends from stripper shoulder 43 to distal end 45 where distal end surface 46 is located. Distal end surface 46 is substantially perpendicular to inner cavity axis 21.

Cylindrical section 44 extends from stripper shoulder 43 to proximal end 47. The diameter of cylindrical section 44 is substantially constant from stripper shoulder 43 until foot 48 which has an increased diameter and defines a surface substantially perpendicular to axis 21.

Rod retainer 40 has a first inner cavity 50 extending from proximal opening 51 to distal opening 52. Rod-retainer cavity 50 has a first segment 53 with a diameter corresponding to the diameter of proximal portion 32 and second segment 55 with a diameter corresponding to intermediate portion 30. Inner shoulder 56 is located at the junction of first segment 53 and second segment 55 and has a surface substantially perpendicular to axis 21. Near proximal opening 51, first segment 53 has an increased diameter defining recess 57.

Figure 4:
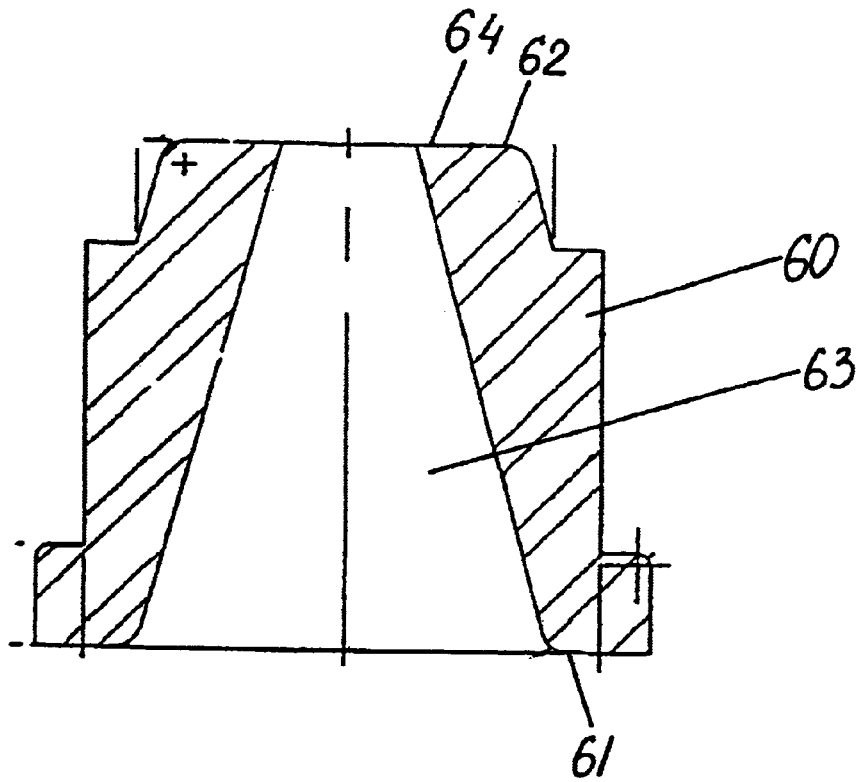
FIG. 4 is a cross-section view of the stripper bushing used in the adjustable core pin, in accordance with the present invention.

FIG. 4 depicts stripper bushing 60. Stripper bushing 60 has a first end 61 and second end 62. Stripper-bushing cavity 63 extends from first end 61 to second end 62 and has a conical shape corresponding to conical section 42 of rod retainer 40. Stripper surface 64 is at second end 62 and is used to contact a vial molded on distal portion 24 of rod 20 in order to eject the vial from rod 20.

Figure 5:
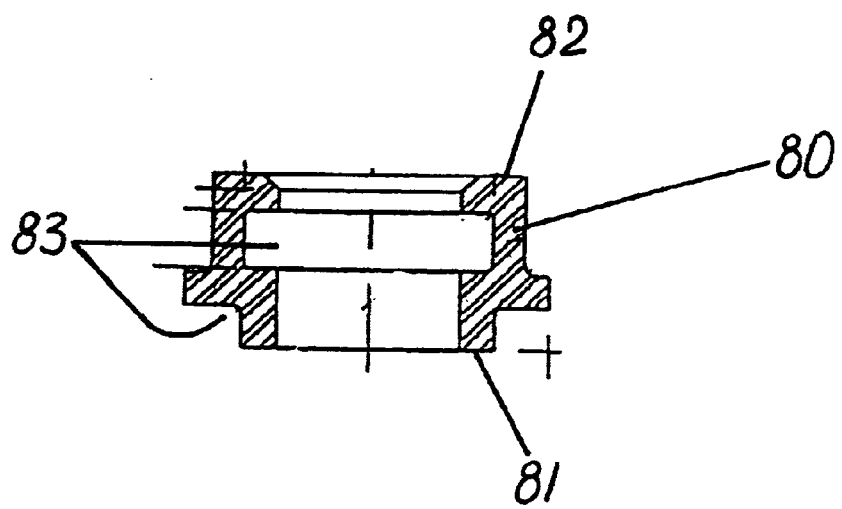
FIG. 5 is a cross-section view of the seal retainer used in the adjustable core pin, in accordance with the present invention.

FIG. 5 depicts seal retainer 80. Seal retainer 80 is received in recess 34 and recess 57 and prevents fluid from entering the interface between rod 20 and rod retainer 40. Seal retainer 80 has proximal end 81 and distal end 82. Distal end 82 of seal retainer 80 may contact the substantially axially perpendicular surface of recessed portion 33 of rod 20. Shims 90 may also be inserted at this junction to adjust the determinable length. Seal retainer 80 includes gasket voids 83 to allow for the placement of gaskets or seals to ensure liquid tight connection between the core pin components.

Figure 6:
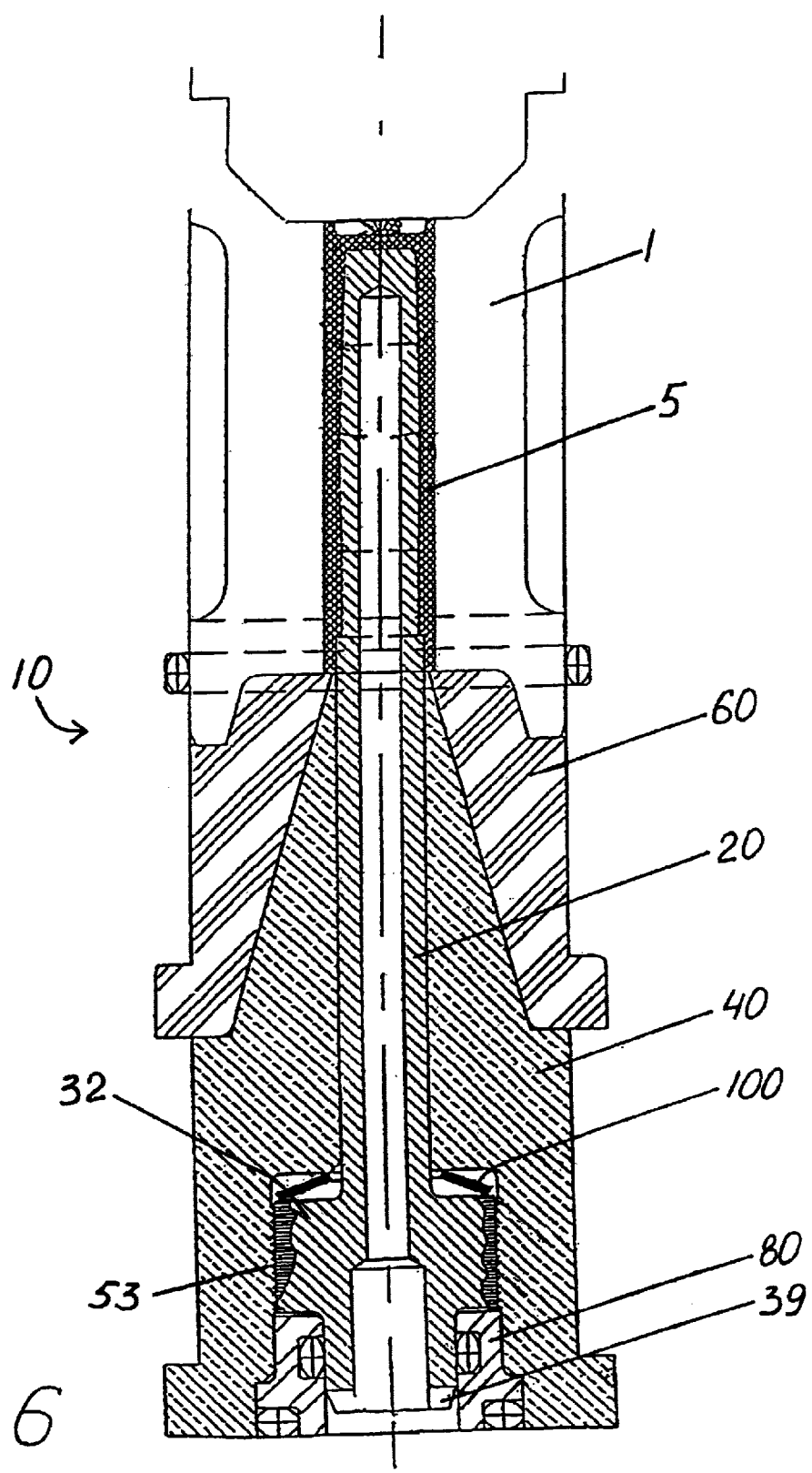
FIG. 6 is a cross-section view of a threaded adjustable core pin with partial cutaway sections to show details otherwise not shown, having the rod, rod retainer and stripper bushing engaged for insertion into a cavity mold, in accordance with the present invention.

FIG. 6 depicts a cross-section of a preferred adjustable core pin 10 upon insertion into a molding cavity 1. The adjustable core pin is comprised of rod 20, rod retainer 40, stripper bushing 60 and seal retainer 80. Spring washer 100 is positioned between rod 20 and rod retainer 40 to maintain the desired rotational relationship between rod 20 and rod retainer 40 by imposing a load on their threads to prevent rotational slippage.

In this preferred embodiment, first segment 53 of cavity 50 of rod retainer 40 and proximal portion 32 of rod 20 are threaded to allow for threaded engagement. Rod 20 may be rotated with respect to rod retainer 40 through spanner wrench slot 39. Upon proper length adjustment via relative rotation, seal retainer 80 with seals may be inserted between rod retainer 40 and rod 20 to prevent fluid from entering the interface between the rod and rod retainer.

While the principles of this invention have been described in connection with specific embodiments, it should be understood clearly that these descriptions are made only by way of example and are not intended to limit the scope of the invention.

What is claimed is:

1. A method of forming vials having two ends, a center between the ends and a barrel-shaped cavity with a maximum inner diameter positioned near the center, comprising the steps of:

providing a mold assembly including a molding cavity;

providing an adjustable core pin including an elongate rod having a barrel-shaped distal portion having a crest and a rod retainer, the rod and rod retainer being movable relative to each other and fastenable to each other such that the crest can be established at a preferred position;

inserting the rod into the molding cavity to define a molding space as the volume between the rod and the cavity;

filling the molding space with moldable material to mold the vial;

withdrawing the rod from the molding cavity;

removing the vial from the rod;

optically measuring the location of the maximum diameter; and in response to the optical measurement, adjusting the rod and rod retainer to establish the crest at the preferred position;

whereby the forming of subsequent vials results in more accurate positioning of the maximum diameter.

2. The method of claim 1 wherein the location of the maximum diameter is optically measured by filling the vial with liquid and sealing the vial with a cap so that a bubble of gas remains inside the vial.

3. The method of claim 1 wherein a number of vials are formed and optically measured before the rod and rod retainer are adjusted to establish the maximum diameter at the preferred position.

4. The method of claim 1 wherein the mold assembly includes a molding base which the core pin is secured to before insertion into the molding cavity.

5. The method of claim 1 wherein the vial is ejected from the rod after vial molding by a stripper bushing in which the rod retainer is positioned.

6. The method of claim 1 wherein the moldable material is transparent plastic.

7. The method of claim 1 further comprising the steps of:

after formation of vials following adjustment of the rod and rod retainer, optically measuring the location of the maximum diameter; and in response to the optical measurement, readjusting the rod and rod retainer to reestablish the crest at the preferred position;

whereby molding of subsequent vials results in more accurate positioning of the maximum diameter near the center of the vial.

8. The method of claim 1 wherein the vial has a distal end with an external surface and a proximal end with an external surface, and wherein the maximum diameter is equidistant from the external surfaces of the distal and proximal ends.

9. The method of claim 1 wherein the vial has at least one marker ring and the optical measurement of the location of the maximum diameter is performed relative to the marker ring.

10. The method of claim 9 wherein the vial has two marker rings and the maximum diameter is equidistant from each marker ring.

* * * * *